July 16, 1929.  C. DANTSIZEN  1,721,374
APPARATUS FOR TESTING INSULATING LIQUIDS
Filed March 29, 1926

Inventor:
Christian Dantsizen,
by
His Attorney.

Patented July 16, 1929.

1,721,374

UNITED STATES PATENT OFFICE.

CHRISTIAN DANTSIZEN, OF SCHENECTADY, NEW YORK, ASSIGNOR TO GENERAL ELECTRIC COMPANY, A CORPORATION OF NEW YORK.

APPARATUS FOR TESTING INSULATING LIQUIDS.

Application filed March 29, 1926. Serial No. 98,382.

My invention relates to a method and apparatus for determinng the insulating properties of liquids, such for example as insulating oils. It has heretofore been the general practice to employ a break-down test for determining the insulating property of liquids by impressing a voltage between electrodes immersed in the liquid and noting the voltage required to cause a break-down of the liquid insulation under predetermined conditions. This requires an appreciable amount of oil, special sine wave alternating current high voltage apparatus, and careful adjustments. Generally speaking, this method of test is erratic, making it necessary to take the average of a number of break-down tests for a final result. The insulating character of the liquid is changed to some extent each time such a break-down test is made because of the disintegrating effect of the break-down current upon the insulating liquid.

It is the object of my invention to provide a test method and apparatus which will largely avoid the disadvantages above mentioned.

In carrying my invention into effect I treat the insulating oil as an electric conductor and measure its resistance directly. The apparatus may take the form of a small glass container for the liquid having spaced electrodes across which a high preferably direct current voltage is impressed. The voltage is not high enough to cause a break-down as in the former method, but the minute current flowing between the electrodes by conduction is measured by a suitable measuring instrument and the insulation resistance calculated directly in accordance with Ohm's law. In order that the test may be readily made at different temperatures a small electric heater may be inserted in the liquid below the electrodes and provision made for inserting a thermometer in the liquid. Only a small quantity of oil is necessary with the new method. The oil is not disintegrated by the test so that as many tests at different temperatures as is desired may be made without changing the oil. The measuring current gives a steady deflection and gives consistent results as contrasted with the sudden erratic break-down test where it is necessary to catch the volt-meter reading at the high point just before a break-down voltage is reached.

The features of my invention which are believed to be novel and patentable will be pointed out in the claims appended hereto.

Figure 2:
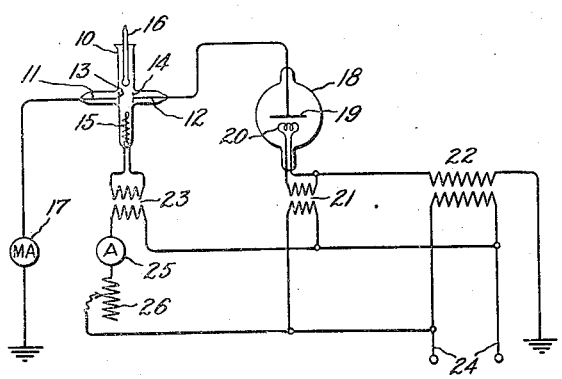
Figure 3:
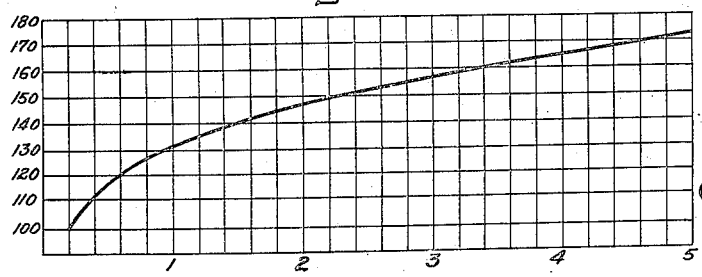

For a better understanding of my invention reference is made in the following description to the accompanying drawing, Fig. 1 of which illustrates a preferred form of the testing container; Fig. 2 illustrates suitable electrical connections for carrying out the tests; and Fig. 3 is a resistance-temperature curve of a liquid insulating compound obtained by my invention.

Figure 1:
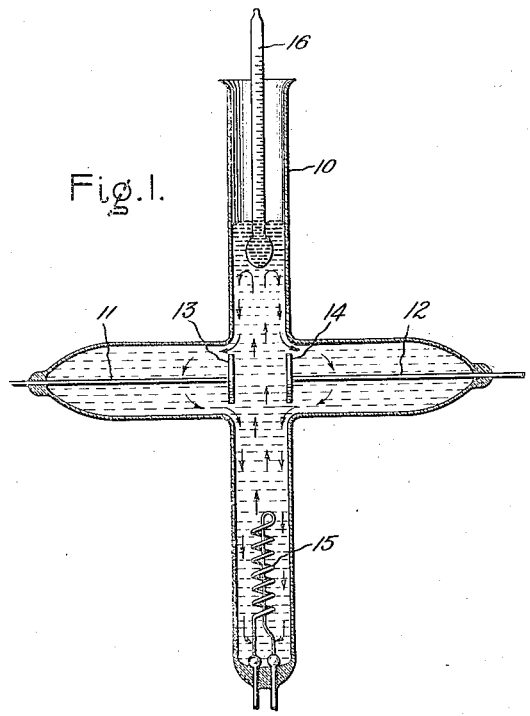

The container 10 shown in Fig. 1 may be made of pyrex glass, or other suitable material capable of withstanding temperature changes, in the form of a cross having horizontal and vertical tube sections. The horizontal tube section may be about one inch in diameter and seven inches long and the vertical section 3/4 inches in diameter and nine inches long. These dimensions are not important but are given as one practical set of dimensions which I have found to be satisfactory and illustrate the small amount of oil needed to make a test. 11 and 12 are leading-in wires preferably made of some such material as molybdenum which will make a good seal with the glass, and are suitably sealed in the ends of the horizontal tube section. 13 and 14 are electrodes which may be made of molybdenum or other suitable material in the form of discs 5/8 inches in diameter and 20 mils thick. These electrodes are spaced apart 3/4 inches. 15 is an electric heater made of a resistance wire such as nichrome with terminals sealed through the walls of the container. The liquid to be tested is poured into the upper open end of the vertical tube section filling the container to a level well above the electrodes, as illustrated. A thermometer 16 may then be inserted into the liquid through the upper opening, in the manner shown. The electrodes are connected in series with a circuit containing a micro-ammeter 17 and a direct current high voltage source such as will give say 20,000 volts across the electrodes 13 and 14. For this purpose a kenotron rectifier 18 may be used with its plate 19 connected to the electrode 14 and its filament 20 connected through the secondary of a step-up transformer 21 to ground, completing the circuit through the test cell and the micro-ammeter, which is also grounded. The primary of transformer 21 is energized from an ordinary alternating current lighting circuit, say 110 volts. A transformer 22 is provided for supplying a heating current to the filament 20 and a transformer 23 is provided for supplying current to the heater 15, all from the same source indicated at 24. Preferably an ammeter 25 and a rheostat 26 are provided in the heater energizing circuit to regulate the temperature at which the oil is to be tested. When the heater 15 is energized it causes a circulation of the oil between the electrodes and around the thermometer bulb, as indicated by the arrows in Fig. 1.

The testing device is preferably first calibrated by using some solution of known resistance in the cell 10. The glass should be perfectly clean so as not to convey current over its surface. Then after the constants of the cell have thus been determined the true specific resistance of insulating oils and insulating compounds may be determined. If desired the instrument may be calibrated directly in resistance units.

The following are the results of a test made at different temperatures on an insulating compound known commercially as "Insulatium cable impregnating compound No. 1" at 20,000 volts direct current across the electrodes.

| Temperature | Current |
| --- | --- |
| 100 degrees centigrade | 0.0000002 amperes. |
| 110 degrees centigrade | 0.0000003 amperes. |
| 120 degrees centigrade | 0.0000006 amperes. |
| 130 degrees centigrade | 0.0000009 amperes. |
| 140 degrees centigrade | 0.0000018 amperes. |
| 150 degrees centigrade | 0.0000026 amperes. |
| 160 degrees centigrade | 0.0000038 amperes. |
| 170 degrees centigrade | 0.0000045 amperes. |
| 180 degrees centigrade | 0.0000058 amperes. |

Thus, at 100° C. the resistance of the compound between the electrodes is $$\frac{20000}{.0000002} = 10000 \text{ megohms.}$$

Fig. 3 shows a temperature current curve plotted from this data.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:—

A device for testing the insulating properties of insulating liquids comprising a glass vessel having four tubular arms in the form of a cross, three of said tubular arms being sealed at their outer ends and the other arm being open at its outer end, an electric heater in the arm opposite to the open-ended arm, leading-in wires sealed in the other two arms, said leading-in wires extending inward to support electrodes spaced apart at the intersection of said crossed arms.

In witness whereof, I have hereunto set my hand this 27th day of March, 1926.

CHRISTIAN DANTSIZEN.